United States Patent Office 3,515,772
Patented June 2, 1970

3,515,772
CYCLIZED POLYDIENE-POLYETHER RESINS
Hyman R. Lubowitz, Redondo Beach, and Eugene A. Burns, Palos Verdes Peninsula, Calif., assignors to TRW Inc., Redondo Beach, Calif., a corporation of Ohio
No Drawing. Filed Aug. 4, 1966, Ser. No. 570,171
Int. Cl. C08d 9/10; C08f 29/12, 41/12
U.S. Cl. 260—836
13 Claims

ABSTRACT OF THE DISCLOSURE

This invention relates to a novel class of thermosetting copolymeric resins and more particularly to cyclized, cross-linked polydiene-polyether copolymers and their method of manufacture. The copolymers are produced by reacting either 1,2-polybutadiene or 3,4-polyisopropylene with a chain-extending organic compound, a polyether compound, and a peroxide free radical initiator to produce an elastomeric material having the peroxide initiator molecularly dispersed therethrough substantially unreacted. Subsequently, the copolymer is cured to a clear, firm resinous material by the application of heat.

Processing of the prior art thermosetting resins has certain inherent difficulties and disadvantages. Most thermosetting resins are transformed during cure from a liquid prepolymer directly to a solid state. Difficulties arise where, for example, a vertical surface is to be coated with a thermosetting plastic, the liquid prepolymer is spread over the surface, and unless the polymer cures almost instantaneously or is extremely viscous, it will run and become uneven. Similar problems arise in castings. Unless a rapid cure is effected on the liquid prepolymer, special castings may have uneven thicknesses making them unsuitable for their intended purpose. This invention overcomes these disadvantages.

Broadly, the thermosetting copolymeric resins of the present invention are produced by reacting a mixture of a polyfunctional polydiene prepolymer having mainly pendant vinyl groups on alternate carbon atoms of an elongated backbone carbon chain and a long chain polyfunctional polyether prepolymer with a polyfunctional organic chain extender capable of reacting with the functional groups of the polydiene and the polyether prepolymers and a peroxide free radical initiator capable of promoting the cyclization of the pendant vinyl groups and the cross-linking of adjacent chains in which a high molecular weight elastomeric material is initially produced. Upon curing by the application of heat, this elastomeric material yields hard plastics consisting of molecular chains of cross-linked, condensed cyclohexane rings linked to polyether chains. Structurally, it is believed that these resins are comprised mainly of blocks of cross-linked linearly extended chains of fused substituted or unsubstituted cyclohexane rings and blocks of polyether groups. The blocks of fused substituted or unsubstituted cyclohexane groups are interconnected with each other and with the blocks of polyether groups by chain extending groups. The thermosetting polydiene resin is produced by a process involving reacting a chemically polyfunctional substituted polydiene prepolymer and a polyfunctional polyether prepolymer with a polyfunctional organic chain extender to increase markedly the molecular weight through extension of the chain length. Cyclizing of the pendant vinyl groups into fused cycloaliphatic groups and cross-linking of adjacent chains are promoted by a peroxide free radical initiator.

Preferably, the functional substituted groups of the polydiene prepolymer and the polyether prepolymer are positioned at the terminal ends of the prepolymer. While difunctional materials characterized by terminal substitution are preferred, other polyfunctional prepolymers having, for example, one terminal group and the other groups located away from the other end of the prepolymer may be employed. The preferred polydienic prepolymer is a 1,2-polybutadienediol having hydroxyl substituents positioned at the terminal ends of the prepolymer, although a 3,4-polyisoprene material such as 3,4-polyisoprenediol may also be used. While a dihydroxy substituted prepolymer material is generally preferred, mainly from the standpoint of ease of reactability, a dicarboxyl substituted compound or other poyldienic prepolymer having chemically functional groups preferably terminally positioned will also be satisfactory.

The details of the preparation of the 1,2-isomeric form of the polydiene prepolymer and its subsequent cyclization are described in copending application Ser. No. 531,026, filed Mar. 2, 1966, now Pat. No. 3,431,235. Polydiene prepolymers used in the production of the thermosetting resin of this invention should have pendant vinyl groups on alternate carbon atoms on the backbone carbon chain constituting at least 80% of the olefinic unsaturation and should have a molecular weight from about 500 to about 3000. The polyether prepolymer can be one of a great variety of polyethers containing functionally substituted groups.

Polyether polyols may be used in preparation of the thermosetting resins of this invention. An important consideration in the selection of the polyether prepolymer is that it does not contain major quantities of vinyl groups substituted on alternate carbon atoms in the backbone chain. In this manner, subsequent cyclization of the polydiene block of the thermosetting resin does not simultaneously cyclize appreciably lengths of the polyether block of the thermosetting resin. A typical-polyether prepolymer is polyoxypropylene glycol having hydroxyl substituents positioned in the terminal ends of the prepolymer having a molecular weight from about 240 to 4200. The polyfunctional substituted polyether prepolymer is preferably a dihydroxy material but may be, for example, a dicarboxyl substituted compound, a diamine substituted compound or other polyether prepolymers having chemically functional groups preferably terminally positioned.

The polydiene prepolymer and polyether prepolymer are reacted with the polyfunctional organic chain extender and a peroxide initiator, and desirably followed by degassing after thorough mixing. In the instance of dihydroxy prepolymers and a diisocyanate chain extender, the chain extending reaction proceeds at room temperature or moderately elevated temperatures to produce a rubber intermediate compound characterized by having the peroxide free radical initiator molecularly dispersed throughout. It will be appreciated that the diisocyanate markedly increases the molecular weight of the prepolymer through formation of polyurethane bonds. Heating of the rubber intermediary to temperatures of about 70° C. to 140° C. promotes cyclizing of the pendant vinyl groups of the polydiene block to form condensed substituted or unsubstituted cyclohexane rings and crosslinking of adjacent chains.

The conditions set forth in the preceding paragraph are typical for the process of the invention employing a dihydroxypolydiene prepolymer, a dihydroxy polyether prepolymer, and a diisocyanate chain extender. It will be appreciated that the conditions will vary with the materials used for production of the thermosetting polydiene-polyether resin and that these conditions may be readily determined by one skilled in the art. In the foregoing example employing a diisocyanate, a dihydroxy polydiene prepolymer and dihydroxy polyether prepolymer, the first chain extending reaction occurs at room temperature and is followed with the second cyclizing and cross-linking reaction occurring at a somewhat higher temperature. Rapid heating of the reactants to elevated temperatures may cause the two reactions to occur substantially simultaneously. For the purposes of this invention the stepwise cure is preferred.

The organic chain extender is normally a difunctional material but may contain more than two functional groups. The preferred polyfunctional organic chain extender when used with a dihydroxy polydiene and dihydroxy polyether prepolymers such as 1,2-polybutadienediol and polyoxypropylene glycol is an organic diisocyanate material which in the process of the invention reacts at a moderately low temperature to form polyurethane bonds to increase markedly the molecular weight of the prepolymers.

The organic diisocyanate chain extenders used to produce these resins may be any of a number of known organic diisocyanates which are used in urethane plastics Typical diisocyanate compounds which may be used to produce the resins of this invention are:

TABLE I 2,4-toluene diisocyanate
hexamethylene diisocyanate
2,6-toluene diisocyanate
dianisidine diisocyanate
1,4-benzenediisocyanate
p,p'-diisocyanate diphenyl methane
1-chlorophenyl-2,4-diisocyanate
trimethylene diisocyanate
pentamethylene diisocyanate
butylene-1,2-diisocyanate
butylene-1,4-diisocyanate
xylene diisocyanate
2,4-cyclohexylene diisocyanate
1,1-dibutyl ether diisocyanate
1,6-cyclopentane diisocyanate
2,5-indene diisocyanate
diphenylmethane diisocyanate
1,5-naphthalene diisocyanate
triphenylmethane diisocyanate The urethane bond joining the chains of the polydienediol and polyether polyol prepolymers employing diisocyanates is desirable in that there is no formation of condensation products such as water or ammonia. The absence of a volatile condensation product makes the reaction particularly useful in the formation of adhesive bonds, laminates, and compact resin masses. Additionally, the urethane copolymer mixture is castable and upon reaction which occurs at a moderately low temperature, produces a long shelf-life, tack-free, rubbery material. The urethane rubber resulting from the diisocyanate reaction has a peroxide free radical initiator molecularly dispersed throughout which is required for the cyclizing and cross-linking reaction to produce the hard thermosetting resin.

There are other possible combinations of chain extension compounds which can produce resins equivalent to those obtained from the diisocyanates-dihydroxy polydiene-polyether prepolymer combinations. For instance, reaction of the dihydroxy prepolymers with dicarboxylic acids, diacid halides, diesters, anhydrides and dianhydrides will produce a resin with blocks capable of cyclization that has been chain extended through polyester groups. The use of dicarboxylic acids, diacid halides, and diesters for chain extension results in the formation of chemical by-products which may be volatile, thereby making these particular combinations less desirable for many applications. Dianhydrides are preferable because chain extension is effected without formation of chemical by-products.

Other possible combinations of reactants can produce cyclized, cross-linked polydiene resins in addition to those utilizing the dihydroxy polydiene prepolymers. For example, polydiene dicarboxylic acid prepolymers having pendant vinyl groups on alternate carbon atoms on the backbone can be chain extended with a variety of compounds such as diols, diamines, diisocyanates, diepoxides, diimines, and diimides. Polydiene dicarboxylic acids chain extended with diepoxides, diimines, and diimides are preferred for the purposes of this invention because chemical-by-products are not formed in the reaction. Typical polydiene dicarboxylic acids include the 1,2-polybutadiene dicarboxylic acid and the 3,4-polyisoprene dicarboxylic acid structures. It will be appreciated that other derivatives of the dicarboxylic acid polydienes, can be used such as diacid halides, polyanhydrides, and diesters and suitable chain extenders will yield equivalent chain extended thermosetting polydiene resins.

Analogous useful resins of cyclized and cross-linked polydiene-polyether polymers can be prepared from chain extended polyfunctional polydiene and polyether amines. Typical diamine chain extenders that provide products that are useful for the purposes of these invention are diisocyanates, anhydrides, dianhydrides, dicarboxylic acids, diacid chlorides, diesters and diepoxides. Similarly as before, the chain extenders such as diisocyanates, dianhydrides and diepoxides which produce no secondary product are preferable for the purposes of this invention.

Among the acids and anhydride chain extenders that may be employed are:

adipic acid
fumarcic acid
1,4-cyclohexanedicarboxylic acid
terephthalic acid
malonic acid
trimer acid, Emery 316 2-D) by Emery Industries
dimer acid (Empol 1022 and 1018) Empol dimer acids by Emery Industries
azelaic acid
sebacic acid
isophthalic acid
endo-cis bicyclo (2,2,1)-5-heptene-2,3-dicarboxylic dianhydride
succinic anhydride
dodecenyl sucinic anhydride
tetrahydrophthalic anhydride
hexahydrophthalic anhydride
maleic anhydride
phthalic anhydride
glutaric anhydride 1,4,5,6,7,7-hexachlorobicyclo-(2,2,1)-5-heptene-2,3-
 dicarboxylic anhydride
tetrachlorophthalic anhydride Suitable dianhydrides and polyanhydride chain extenders include the following:

TABLE III 3,3',4,4'-benzophenone tetracarboxylic dianhydride
polyazelaic polyanhydride
pyromellitic dianhydride
pyromellitic dianhydride-glycol adducts
1,2,3,4-cyclopentane tetracarboxylic dianhydride Suitable diahydrides and polyanhydride chain extenders include the following:

TABLE IV epoxy novalacs (Dow chemical)
bis-epoxydicyclopentyl ether of ethylene glycol
epichlorohydrin/bis phenol A-type
1-epoxyethyl-3,4-epoxycyclohexane
dicyclopentadiene dioxide
3,4-epoxy-6-methylcychohexylmethyl-3,4-epoxy-6-
 methylcyclohexanecarboxylate
zeaxanthin diepoxide
9,10-epoxy-12-hydroxyoctadecanoic acid, triester with
 glycerol Suitable diimine diimide and triimide chain extenders include the following:

TABLE V 1,6-hexane, N,N'diethylenimine
1,6-hexane, N,N'dipropylenimine
1,7-heptane, N,N'diethylenimine
1,7-heptane, N,N'dipropylenimine
1,8-octane, N,N'diethylenimine
1,8-octane, N,N'dipropylenimine
1,3-di (carboxy-N-proplenimide) benzene
1,3,5-tri (carboxy-N-proplenimide) benzene
1,3-di (ethylene-N-1,2-butylimine) benzene In some applications, a catalyst may be supplied to accelerate the chain extension reaction. For example, in the formation of the urethane bond between the diisocyanate and the dihydroxypolydiene and dihydroxy polyether prepolymers it is sometimes desirable to provide a catalyst which promotes polyurethanation. Suitable catalysts to promote the formation of the chain extending bonds through the reactions of other compounds are well known in the art. Similarly, the conditions generally favoring the reactions involving other combinations of reactants are known. For example, the chain extension reaction occurring between a dicarboxylpolydiene prepolymer and dicarboxylic polyether prepolymer with a diimine organic chain extender will be usually carried out in the range of 20 to 90° C. and that of a dicarboxylpolydiene prepolymer and dicarboxylic polyether prepolymer, a diepoxide chain extender generally in the range of 50 to 120° C. Where the polydiene and polyether prepolymer structures carry terminal amine groups the reaction with a diisocyanate to form a polyurea chain extending linkage is carried out generally in the range of 0 to 50° C. In the instance where the dihydroxy polydiene prepolymer and dihydroxy polyether prepolymer are extended through an ester linkage through reaction with a dibasic acid, the reaction is typically carried out in the range of 80 to 135° C. A dianhydride chain extension with dihydroxy-polydiene prepolymers and dihydroxy polyether prepolymers will proceed in temperature range approximately 20 to 30° C. lower than that of the dibasic acid reaction. A chain extension employing a diacid chloride reacting with a dihydroxypolydiene prepolymer and dihydroxy polyether prepolymer will proceed in the general range of 40 to 100° C. It will be appreciated that the presence or absence of a catalyst will have a bearing upon the reaction conditions. The foregoing temperature ranges are provided to give only an indication of general conditions are not intended to be limiting.

Several long chain polyether polyols are suitable for use as the prepolymers in these resins. Selections from the wide range of available polyether polyols should be governed with the properties of the end product in mind. Generally, polyether polyols used in resins according to this invention should have a molecular weight between 240 and 4200. Typical polyether polyols which are suitable as prepolymers are as follows:

TABLE VI polyoxypropylene glycols
polyoxypropylene triols
polyoxytetramethylene glycols
polyoxybutylene glycols
polyoxybutylene triols Important to the latter steps of the process are the organic peroxide free radical initiators. These peroxide initiators are instrumental in the cyclization of the pendant vinyl groups of the polydiene and the cross-linking of adjacent chains. The peroxide initiator is introduced into the initial mixture along with the polydiene prepolymer, the polyether prepolymer, and the organic chain extender whereupon it becomes molecularly dispersed throughout the copolymeric elastomer. Upon the application of heat in the final step, the peroxide initiator decomposes to provide free radicals which force the pendant vinyl groups to join to form a condensed cyclohexane chain. Organic peroxides which may be used to assist the cyclization of the pendant vinyl groups are.

TABLE VII di-t-butyl peroxide
2,5-dimethyl-2,5-bis(tertiary butylperoxy) hexane
n-butyl-4,4-bis(tertiary butylperoxy) valerate
2,5-dimethyl-2,5-bis(tertiary butylperoxy)hexyne-3
tertiary-butyl perbenzoate
dicumyl peroxide
methyl ethyl ketone peroxide
cumene hydroperoxide
di-N-methyl-t-butyl percarbamate
lauroyl peroxide
acetyl peroxide
decanoyl peroxide
t-butyl peracetate
t-butyl peroxyisobutyrate Chemical structure of the resin product obtained by reacting 1,2-polybutadienediol and polyoxypropylene glycol and 2,4-toluene diisocyanate in the presence of free radical initiators is represented ideally as follows:

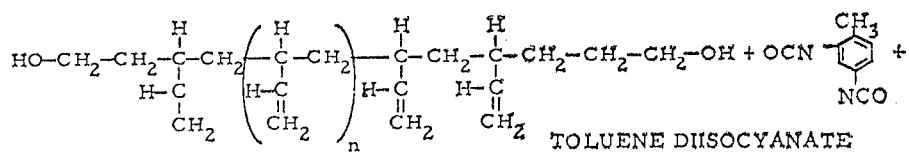

DIHYDROXY 1,2 POLYBUTADIENE

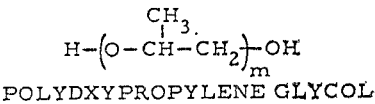

POLYOXYPROPYLENE GLYCOL

CHAIN EXTENSION TO FORM
POLYURETHANE ELASTOMER
INTERMEDIATES

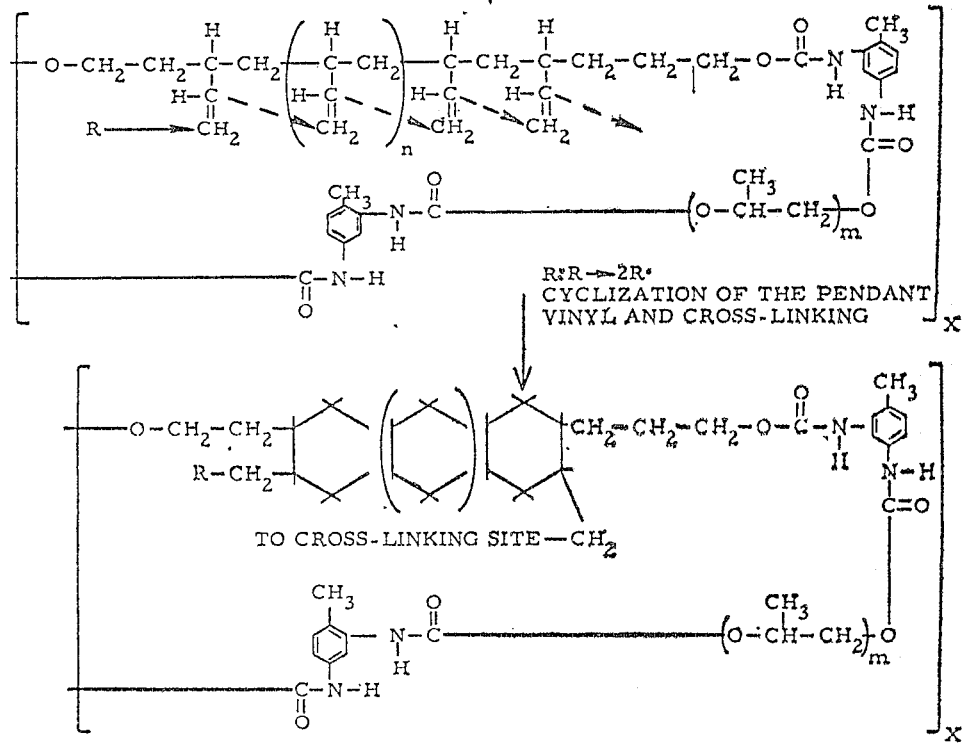

where $n$ is equal to a sufficient number of repetitions to impart a molecular weight of between about 500 to 3000 to the cyclized portion of the molecule and $m$ is equal to a sufficient number of repetitions to impart a molecular weight of between about 240 and 4200 to the long chain polyether portion of the molecule.

In preparing these resins, for example, a polydienediol prepolymer is thoroughly mixed with a long chain polyether polyol, an organic diisocyanate, and a peroxide free radical initiator until a homogeneous consistency is achieved. The polydiene diol and the polyether polyol may be in any desired proportions, but the diisocyanate should be in approximately stoichiometric amount to the polydiene-polyether polyol mixture. The peroxide is generally employed in an amount within the range of 0.5% and 10% by weight of the polymer and the diisocyanate chain extender, and preferably within the range of 2% to 6%.

A chain extending reaction proceeds at room temperature or moderately elevated temperatures to produce an elastomeric intermediate compound characterized by having the peroxide free radical initiator molecularly dispersed throughout. While the polymer is in this elastomeric state it may be easily handled and fabricated. When the final article has been constructed, the rubbery intermediary is heated in the range of 150° F. to 400° F. whereupon cyclization and cross-linking takes place to produce a hard, transparent plastic which is resistant to impact.

Resins of the present invention have a wide varied field of application. They may be used in laminates, fills, stiff foams, films, and coatings to mention a few. Due to their unique elastomeric intermediate state, fabrication problems are minimized.

The following specific embodiments will further illustrate this invention and are not intended to be limiting:

EXAMPLE I

Twenty parts of a 1,2-polybutadiene diol having an average molecular weight of 2000, 60 parts of polyoxypropylene triol having an average molecular weight of 3000, and 1.75 parts of ditertiary butyl peroxide are placed in a glass vessel and mixed thoroughly. Eight parts of toluene diisocyanate are then added to the vessel and the solution stirred until it becomes homogeneous. The solution is degassed in a vacuum chamber at an applied vacuum of about 1 mm. Hg for approximately 15 minutes. At the end of the degassing period the material is cast into a mold and cured consecutively under the following sets of conditions:

(1) 18 hours at 90° C. in air
(2) 7 hours at 115° C. in air.

The cured resins are opaque and rubbery in appearance. A typical casting had hardnesses less than 0 Barcol.

EXAMPLE II

Twenty parts of a 1,2-polybutadiene diol having an average molecular weight of 2000, ten parts of polyoxypropylene triol having an average molecular weight of 1000, and 0.69 parts of ditertiary butyl peroxide are placed in a glass vessel and mixed thoroughly. Five parts of toluene diisocyanate are then added to the vessel and the solution stirred unitl it becomes homogeneous. The solution is degassed in a vacuum chamber at an applied vacuum of about 1 mm. Hg for approximately 15 minutes. At the end of the degassing period the material is cast into a mold and cured consecutively under the following sets of conditions:

(1) 2 hours at 90° C. in air
(2) 20 hours at 115° C. in air.

The cured resins are opaque and rubbery in appearance. A typical casting had hardnesses less than 0 Barcol.

EXAMPLE III

Fifty parts of a 1,2-polybutadiene diol having an average molecular weight of 2000, 50 parts of polyoxypropylene triol having an average molecular weight of 2000, and one part of ditertiary butyl peroxide are placed in a glass vessel and mixed thoroughly. Fourteen parts of toluene diisocyanate are then added to the vessel and the solution stirred until it becomes homogeneous. The solution is degassed in a vacuum chamber at an applied vacuum of about 1 mm. Hg for approximately 15 minutes. At the end of the degassing period the material is cast into a mold and cured consecutively under the following sets of conditions:

(1) 5 days at 90° C. in air
(2) 5 days at 115° C. in air.

The cured resins are semi-transparent and rubbery in appearance. A typical casting had hardnesses less than 0 Barcol.

EXAMPLE IV

Fifty parts of a 1,2-polybutadiene diol having an average molecular weight of 2000, 50 parts of polyoxypropylene triol having an average molecular weight of 1000, and one part of ditertiary butyl peroxide are placed in a glass vessel and mixed thoroughly. Fourteen parts of toluene diisocyanate are then added to the vessel and the solution stirred until it becomes homogeneous. The solution is degassed in a vacuum chamber at an applied vacuum of about 1 mm. Hg for approximately 15 minutes. At the end of the degassing period the material is cast into a mold and cured consecutively under the following sets of conditions:

(1) 5 days at 90° C. in air
(2) 5 days at 115° C. in air.

The cured resins are semi-transparent and rubbery in appearance. A typical casting had hardnesses less than 0 Barcol.

EXAMPLE V

Sixty-seven parts of a 1,2-polybutadiene diol having an average molecular weight of 2000, 100 parts of polyoxypropylene triol having an average molecular weight of 3000, and 3.6 parts of ditertiary butyl peroxide are placed in a glass vessel and mixed thoroughly. Twenty-four parts of bitolylene diisocyanate are then added to the vessel and the solution stirred until it becomes homogeneous. The solution is degassed in a vacuum chamber at an applied vacuum of about 1 mm. Hg for approximately 15 minutes. At the end of the degassing period the material is cast into a mold and cured consecutively under the following sets of conditions:

(1) 11 days at 90° C. in air
(2) 9 days at 115° C. in air.

The cured resins are opaque, rubbery, and yellow in appearance. A typical casting had hardnesses less than 0 Barcol.

The attractiveness of these resins will be readily apparent to those skilled in the art. Resins according to this invention are prepared from viscous polymeric materials, but unlike other polymeric materials, the curing process can be stopped at an intermediate stage for an indefinite period. The intermediate stage is an elastomeric material which can be readily cut, punched, shaped, or subjected to almost any mechanical fabrication. When the final article is shaped, heat is applied and the article forms into a hard, rigid resinous material.

The resins may be mixed and reacted to the intermediate elastomeric stage at a central factory, then packaged and shipped to the place of use where final curing is effected on the final article. It is readily seen that such methods of manufacture will permit heretofore unobtainable uniformity in resin products.

What is claimed is:

1. A method of producing a thermosetting polydiene-polyether copolymeric resin comprising:
    reacting (A) a polydiene having (1) polyfunctional groups selected from the group consisting of hydroxyl and carboxyl and (2) a predominant amount of vinyl groups on alternate carbon atoms of the polydiene backbone and (B) a polyether having polyfunctional groups selected from the group consisting of hydroxyl and carboxyl with (C) a chain-extender capable of reacting with the functional groups on the polydiene and the polyether at ambient temperature in the presence of (D) a peroxide free radical initiator to produce an elastomeric material having the peroxide dispersed therethrough substantially unreacted, and
    curing the elastomer at elevated temperatures to produce a firm resinous material.

2. A method according to claim 1 wherein the polydiene is selected from the group consisting of 1,2-polybutadiene and 3,4-polyisoprene.

3. A method according to claim 1 wherein the polyether is selected from the group consisting of polyoxypropylene glycol, polyoxypropylene triol, polyoxytetramethylene glycol, polyoxybutylene glycol, and polyoxybutylene triol.

4. A method according to claim 1 wherein the chain-extender capable of reaction with the hydroxyl functional groups on the polydiene and the polyether is selected from the group consisting of (a) diisocyanate substituted aliphatic compounds, (b) diisocyanate substituted aromatic compounds, (c) diacid halide substituted aliphatic compounds, (d) diacid halide substituted aromatic compounds, (e) dicarboxylic acid substituted aliphatic compounds, (f) dicarboxylic acid substituted aromatic compounds, (g) diester substituted aliphatic compounds, and (h) diester substituted aromatic compounds.

5. A method according to claim 1 wherein the chain-extender capable of reaction with the carboxyl functional group on the polydiene and the polyether is selected from the group consisting of (a) diepoxide substituted aliphatic compounds, (b) diepoxide substituted aromatic compounds, (c) diamine substituted aliphatic compounds, (d) diamine substituted aromatic compounds, (e) dihydroxyl substituted aliphatic compounds, (f) dihydroxyl substituted aromatic compounds, (g) diaziridine substituted aliphatic compounds, and (h) diaziridine substituted aromatic compounds.

6. A thermosetting polydiene-polyether copolymeric resin comprising the reaction product of (A) a polydiene having (i) polyfunctional groups selected from the group consisting of hydroxyl and carboxyl and (ii) a predominant amount of vinyl groups on alternate carbon atoms on the polydiene backbone, (B) a polyether having polyfunctional groups selected from the group consisting of hydroxyl and carboxyl, (C) a chain-extender capable of reacting with the functional groups on the polydiene and the polyether, and (D) a peroxide free radical initiator molecularly dispersed throughout substantially unreacted.

7. A thermosetting resin according to claim 6 wherein the polydiene is selected from the group consisting of 1,2-polybutadiene and 3,4-polyisoprene.

8. A thermosetting resin according to claim 6 wherein the polyether is selected from the group consisting of polypropylene glycol, polyoxy propylene triol, polyoxytetramethylene glycol, polyoxybutylene glycol, and polyoxybutylene triol.

9. A thermosetting resin according to claim 6 wherein the chain-extender capable of reaction with the hydroxyl functional groups on the polydiene and the polyether is selected from the group consisting of (a) diisocyanate substituted aliphatic compounds, (b) diisocyanate substituted aromatic compounds, (c) diacid halide substituted aliphatic compounds, (d) diacid halide substituted aromatic compounds, (e) dicarboxylic acid substituted aliphatic compounds, (f) dicarboxylic acid substituted aromatic compounds, (g) diester substituted aliphatic compounds, and (h) diester substituted aromatic compounds.

10. A thermosetting resin according to claim 6 wherein the chain-extender capable of reaction with the carboxyl functional groups on the polydiene and the polyether is selected from the group consisting of (a) diepoxide substituted aliphatic compounds, (b) diepoxide substituted aromatic compounds, (c) diamine substituted aliphatic compounds, (d) diamine substituted aromatic compounds, (e) dihydroxyl substituted aliphatic compounds, (f) dihydroxyl substituted aromatic compounds, (g) diaziridine substituted aliphatic compounds, and (h) diaziridine substituted aromatic compounds.

11. A firm thermoset polydiene-polyether copolymeric resin prepared by curing in the presence of a peroxide free radical initiator, the reaction product of (1) a polydiene having (i) polyfunctional groups selected from the group consisting of hydroxyl and carboxyl and (ii) a predominant amount of vinyl groups on alternate carbon atom of the polydiene backbone, (2) a polyether having polyfunctional groups selected from the group consisting of hydroxyl and carboxyl, and (3) a chain-extender capable of reacting with the functional groups on the polydiene and the polyether.

12. A firm thermoset polydiene-polyether copolymer resin according to claim 11 wherein the chain-extender capable of reacting with the hydroxyl functional groups on the polydiene and the polyether is selected from the group consisting of (a) diisocyanate substituted aliphatic compounds, (b) diisocyanate substituted aromatic compounds, (c) diacid halide substituted aliphatic compounds, (d) diacid halide substituted aromatic compounds, (e) dicarboxylic acid substituted aliphatic compounds, (f) dicarboxylic acid substituted aromatic compounds, (g) diester substituted aliphatic compounds, and (h) diester substituted aromatic compounds.

13. A firm thermoset polydiene-polyether copolymer resin according to claim 11 wherein the chain-extender capable of reacting with the carboxyl functional group on the polydiene and the polyether is selected from the group consisting of:

(a) diepoxide substituted aliphatic compounds,
(b) diepoxide substituted aromatic compounds,
(c) diamine substituted aliphatic compounds,
(d) diamine substituted aromatic compounds,
(e) dihydroxyl substituted aliphatic compounds,
(f) dihydroxyl substituted aromatic compounds,
(g) diaziridine substituted aliphatic compounds, and
(h) diaziridine substituted aromatic compounds.

References Cited

UNITED STATES PATENTS

| | | | |
|---|---|---|---|
| 2,439,514 | 4/1948 | Hendon | 154—136 |
| 2,877,212 | 3/1959 | Seligman | 260—77.5 |
| 2,968,647 | 1/1961 | Koenche et al. | 260—77.5 |
| 3,055,952 | 9/1962 | Goldberg | 260—635 |
| 3,084,141 | 4/1963 | Knave et al. | 260—85.1 |
| 3,135,716 | 6/1964 | Chance et al. | 260—93.5 |
| 3,147,313 | 9/1964 | Hsieh | 260—837 |
| 3,203,944 | 8/1965 | Hsieh | 260—94.7 |
| 3,285,949 | 11/1966 | Siebert | 260—77.5 |
| 3,338,861 | 8/1967 | Master | 260—33.6 |

FOREIGN PATENTS

| | | |
|---|---|---|
| 589,950 | 12/1959 | Canada. |
| 676,047 | 12/1963 | Canada. |
| 677,255 | 12/1963 | Canada. |
| 957,788 | 5/1964 | Great Britain. |

OTHER REFERENCES

"Product Data Bulletin Number 505," Sinclair Petro Chemicals, May 1, 1965.

MURRAY TILLMAN, Primary Examiner

P. LIEBERMAN, Assistant Examiner

U.S. Cl. X.R.

260—47, 75.2, 77.5, 78.4, 837, 858, 859, 887